(No Model.)
G. JOHNSTON.
APPARATUS FOR AUTOMATICALLY FEEDING WINE CASKS IN CELLARS.
No. 340,786. Patented Apr. 27, 1886.
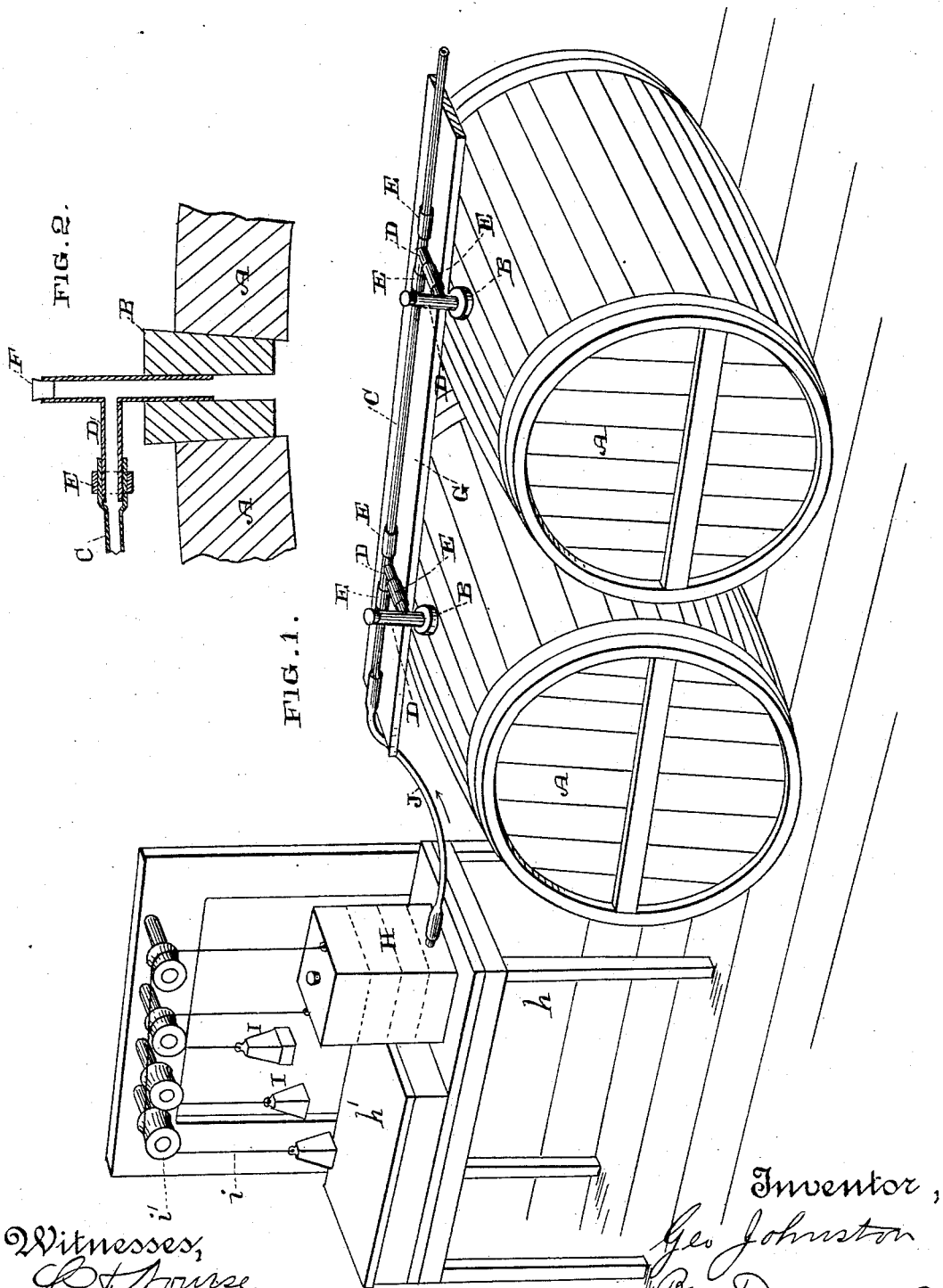

UNITED STATES PATENT OFFICE.

GEORGE JOHNSTON, OF SAN FRANCISCO, CALIFORNIA.

APPARATUS FOR AUTOMATICALLY FEEDING WINE-CASKS IN CELLARS.

SPECIFICATION forming part of Letters Patent No. 340,786, dated April 27, 1886.

Application filed July 27, 1885. Serial No. 172,816. (No model.)

*To all whom it may concern:*

Be it known that I, GEORGE JOHNSTON, of the city and county of San Francisco, State of California, have invented an Improvement in Apparatus for Automatically Feeding Wine-Casks in Cellars; and I hereby declare the following to be a full, clear, and exact description of the same.

My invention relates to a new and useful apparatus or device, the object of which is to keep constantly full casks or vats of wine or other fermented liquors, thereby lessening the risk of acetic fermentation or other deterioration by exposure to the atmosphere.

My invention consists of a novel pipe-service for the casks or vats and an elevated supply or feed tank connecting with said service, said tank being actuated by a series of weights to rise as its contents are discharged, whereby the level of its liquid remains at the same elevation above the casks or vats and maintains the same pressure thereon, all of which, together with details of construction, I shall hereinafter fully describe by reference to the accompanying drawings, in which—

Figure 1 is a view of two casks or vats of a wine-cellar, the pipe-service connecting them, and the tank by which they are supplied. Fig. 2 is a section showing the plug or bung of a a cask and the service-T connected with it.

During the confining and storing of wines evaporation through the wood of which the cask is composed is constantly going on. This waste is made up by removing the bungs or plugs on the top of the cask at intervals of days or weeks and filling up the cask with wine. That portion of the stave and bung or plug which is alternately wet and dry is liable to become moldy and sour, thereby injuring the wine. To avoid this danger, and to reduce the expense of attending to the wine, I have the apparatus which I shall now describe.

A are two casks or vats, which may be supposed to be in a wine-cellar. They are provided with plugs or bungs B.

C is the glass tube or pipe, provided with glass T-tubes D, which pass through the bungs, as shown in Fig. 2, and are connected with the glass tube by means of rubber couplings E. The tops of the T-tubes are provided with plugs or corks F.

G is a plank resting on the casks and acting as a support for the glass tube C.

In a suitable portion of the cellar is the supply-tank H, which ordinarily rests upon a frame, h. I are weights having suspension cords or ropes i, which pass over suitable guide-pulleys, i', and are connected with the supply-tank H. I have here shown three of these weights, and it will be observed that they are suspended by different lengths of cords, so that they will successively reach and rest upon the supplementary platform h'.

The tank H is made of glass, and is connected with the glass service-pipe C by means of a rubber or other flexible tube, J.

The operation of my apparatus is as follows: While it is necessary to keep the tanks or vats A constantly supplied and full, it is also important that the pressure which is brought to bear upon them shall be as little as possible, and shall, moreover, remain constant. Though the first object is effected by the elevation of the tank, the latter result could not be obtained by simply having such elevated supply-tank, for the reason that as the level of the liquid in said tank descended the pressure would be constantly lessened; but with the apparatus I have shown I can keep the pressure about the same. For example, suppose the supply-tank, with its contents, to weigh two hundred and thirty pounds, and the depth of wine in it to be twenty-four inches. Then suppose the longest suspended weight to be fifty pounds, the next to be fifty pounds, and the shortest to be eighty pounds, so that the entire weight counterbalancing the tank would be one hundred and eighty pounds. Now, as soon as a little more than six inches from the tank H passes into the storage casks or vats A the weight of the supply-tank will be so much reduced that the one hundred and eighty pounds of counterbalancing-weight will raise the supply-tank six inches, at which point the longest suspended weight will rest upon the supplementary platform h'. The pressure on the storage-casks will now be the same as it was in the commencement of the operation, and in like manner as the wine becomes exhausted the other weights successively raise the supply-tank, keeping up the same pressure and feed to the storage-casks.

The flexible tube J permits the rise and fall of the supply-tank.

The object in making the supply-tank of glass and the service-pipes of glass tubing is to prevent any absorption of the wine and the deleterious results which would flow from the use of any absorbent or corrosive material in this connection; and I do not confine myself therefore wholly to the use of glass, but may use any non-absorbent or non-corrosive material which will accomplish the same results. The rubber used in this connection as couplings and as the connecting-pipe is for the same purpose.

If at any time a doubt should be entertained of the effective working of the apparatus, the plug or cork F in the top of the T-tubes may be removed, (first pressing upon the rubber coupling to cut off the supply,) when the contents of the cask may be investigated.

By means of this apparatus the storage casks or vats are always full, and the waste in handling and the exposure of the wine to the air are reduced to a minimum. There is, moreover, a saving in time and labor.

I am not aware that in a wine-cellar a supply-tank and suitable service have ever been used to keep the casks or vats full.

Having thus described my invention, what I claim as new, and desire to secure by Letters Patent, is—

1. In an apparatus for supplying the storage casks or vats of a wine or other liquor or spirit cellar, the combination of a supply-tank suspended so as to rise to a given point as its contents are discharged, a service-pipe, and suitable T-tubes, the said tank, pipes, and tubes being made of glass, and rubber couplings and connections, substantially as herein described.

2. An apparatus for automatically supplying the storage casks or vats of a wine or other liquor or spirit cellar, comprising the supply-tank H, suspending weights connected with the tank and adapted to raise it to a given point as its contents are discharged, and a pipe-service connecting the tank with the casks, substantially as herein described.

3. An apparatus for supplying the storage casks or vats of a wine or other liquor or spirit cellar, comprising the tank H, the suspended lifting-weights I, connected with the tank, and having different elevations, the platform $h'$, on which the weights successively rest, and a pipe-service connecting the tank with the casks, substantially as herein described.

4. An apparatus as herein described, consisting of the tank H, the tank-lifting weights I, suspended at different elevations, the platform $h'$, on which they successively rest, the service-pipe C, connecting the casks or vats in the cellar by means of suitable T-tubes, and the flexible tube J, connecting the service-pipe with the tank, substantially as and for the purpose herein described.

In witness whereof I have hereunto set my hand.

GEORGE JOHNSTON.

Witnesses:
S. H. NOURSE,
H. C. LEE.